(12) United States Patent
Lee et al.

(10) Patent No.: US 9,246,152 B2
(45) Date of Patent: Jan. 26, 2016

(54) BATTERY PACK CONTAINING ELECTRODE TERMINAL CONNECTING DEVICE

(75) Inventors: Jin Kyu Lee, Busan (KR); Jaeseong Yeo, Daejeon (KR); Jongmoon Yoon, Daejeon (KR); Yongshik Shin, Daejeon (KR); Bum Hyun Lee, Seoul (KR)

(73) Assignee: LG Chem, Ltd. (KR)

( * ) Notice: Subject to any disclaimer, the term of this patent is extended or adjusted under 35 U.S.C. 154(b) by 1076 days.

(21) Appl. No.: 13/121,070

(22) PCT Filed: Sep. 23, 2009

(86) PCT No.: PCT/KR2009/005404
§ 371 (c)(1),
(2), (4) Date: Jun. 14, 2011

(87) PCT Pub. No.: WO2010/044552
PCT Pub. Date: Apr. 22, 2010

(65) Prior Publication Data
US 2011/0237139 A1   Sep. 29, 2011

(30) Foreign Application Priority Data

Oct. 14, 2008   (KR) .................. 10-2008-0100624

(51) Int. Cl.
*H01M 2/20*   (2006.01)
*H01M 2/10*   (2006.01)
(Continued)

(52) U.S. Cl.
CPC ............ *H01M 2/206* (2013.01); *H01M 2/1077* (2013.01); *H01M 2/32* (2013.01); *H01M 2/347* (2013.01); *H01M 2200/00* (2013.01)

(58) Field of Classification Search
CPC ..... H01M 2/1077; H01M 2/206; H01M 2/32; H01M 2200/00; H01M 2/347; H01M 2200/20; H01H 2039/008
USPC .................................................. 429/754, 388
See application file for complete search history.

(56) References Cited

U.S. PATENT DOCUMENTS 5,120,617 A * 6/1992 Cameron ........................ 429/7
5,804,770 A * 9/1998 Tanaka ...................... 174/138 F
(Continued)

FOREIGN PATENT DOCUMENTS

CN   101164179 A   4/2008
CN   101188274 A   5/2008
(Continued)

OTHER PUBLICATIONS

International Search Report, PCT/KR2009/005404, dated Mar. 23, 2010.

*Primary Examiner* — Nicholas P D'Aniello
*Assistant Examiner* — Philip A Stuckey
(74) *Attorney, Agent, or Firm* — Lerner, David, Littenberg, Krumholz & Mentlik, LLP

(57) ABSTRACT

Disclosed herein is a middle or large-sized battery pack having a plurality of electrically connected battery modules, the middle or large-sized battery pack including an electrode terminal connecting device, wherein the electrode terminal connecting device includes a conductive connecting member coupled to electrode terminals of the battery modules to electrically connect the electrode terminals of the battery modules to each other and a shut-off cutter mounted to the conductive connecting member to shut off the circuit of the conductive connecting member when impact is applied to the battery pack in the longitudinal direction of the battery pack.

14 Claims, 6 Drawing Sheets

(51) Int. Cl.
*H01M 2/32* (2006.01)
*H01M 2/34* (2006.01)

(56) References Cited

U.S. PATENT DOCUMENTS

| | | | |
|---|---|---|---|
| 2004/0041682 A1 | 3/2004 | Pasha et al. | |
| 2004/0180261 A1* | 9/2004 | Saito et al. | 429/176 |
| 2005/0083164 A1* | 4/2005 | Caruso et al. | 337/157 |
| 2006/0145808 A1 | 7/2006 | Von Behr et al. | |
| 2009/0311607 A1* | 12/2009 | Han et al. | 429/246 |

FOREIGN PATENT DOCUMENTS

| | | |
|---|---|---|
| JP | 10-334882 | 12/1998 |
| JP | 11-353997 | 12/1999 |
| JP | 2004-159439 A | 6/2004 |
| KR | 20060073383 A | 6/2006 |
| KR | 20060073433 A | 6/2006 |
| KR | 20060116424 * | 11/2006 |
| KR | 20060116424 A | 11/2006 |
| WO | 2004-077478 A1 | 9/2004 |
| WO | 2006/112628 A1 | 10/2006 |

* cited by examiner

BATTERY PACK CONTAINING ELECTRODE TERMINAL CONNECTING DEVICE

CROSS REFERENCE TO RELATED APPLICATIONS

The present application is a national phase entry under 35 U.S.C. §371 of International Application No. PCT/KR2009/0005404, filed Sep. 23, 2009, published in Korean, which claims priority from Korean Patent Application No. 10-2008-0100624, filed Oct. 14, 2008. The disclosures of said applications are incorporated by reference herein.

TECHNICAL FIELD

The present invention relates to a middle or large-sized battery pack including an electrode terminal connecting device, and, more particularly, to a middle or large-sized battery pack having a plurality of electrically connected battery modules, the middle or large-sized battery pack including an electrode terminal connecting device, wherein the electrode terminal connecting device includes a conductive connecting member coupled to electrode terminals of the battery modules to electrically connect the electrode terminals of the battery modules to each other and a shut-off cutter mounted to the conductive connecting member to shut off the circuit of the conductive connecting member when impact is applied to the battery pack in the longitudinal direction of the battery pack.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Generally, a plurality of unit cells are mounted in a cartridge which connects the unit cells in series and/or in parallel to each other, and a plurality of cartridges are electrically connected to each other, thereby manufacturing a battery module. According to circumstances, two or more battery modules are electrically connected to each other, thereby manufacturing a middle or large-sized battery pack or system providing higher power.

Meanwhile, such a middle or large-sized battery pack exhibits high safety with respect to deformation of the battery pack in the thickness thereof but low safety with respect to deformation of the battery pack in the electrode terminal direction of the battery cells.

In particular, in a case in which a plurality of battery cells is electrically connected in series to each other as in a middle or large-sized battery pack, a short circuit occurs at electrode terminal regions of a battery module when external force caused due to, for example, vehicle collision is applied to the battery pack with the result the battery pack may catch fire or explode.

Consequently, there is a high necessity for a middle or large-sized battery pack including an electrode terminal connecting device that is capable of shutting off an electrode terminal connection region of a battery module through a simple structure when external force is applied to the battery pack, thereby fundamentally solving the above problems.

DISCLOSURE

Technical Problem

Therefore, the present invention has been made to solve the above problems, and other technical problems that have yet to be resolved.

Specifically, it is an object of the present invention to provide a middle or large-sized battery pack including an electrode terminal connecting device including a conductive connecting member having a specific structure and a shut-off cutter wherein, when external force caused due to, for example, vehicle collision is applied to the battery pack in the longitudinal direction of the battery pack, the conductive connecting member is cut by the shut-off cutter to release the electrical connection between battery modules, thereby lowering risks at the level of the battery pack to the level of the battery modules.

Technical Solution

In accordance with one aspect of the present invention, the above and other objects can be accomplished by the provision of a middle or large-sized battery pack having a plurality of electrically connected battery modules, the middle or large-sized battery pack including an electrode terminal connecting device, wherein the electrode terminal connecting device includes a conductive connecting member coupled to electrode terminals of the battery modules to electrically connect the electrode terminals of the battery modules to each other and a shut-off cutter mounted to the conductive connecting member to shut off the circuit of the conductive connecting member when impact is applied to the battery pack in the longitudinal direction of the battery pack.

As described above, the a middle or large-sized battery pack according to the present invention includes the electrode terminal connecting device, which includes the conductive connecting member to electrically connect the electrode terminals to each other and the shut-off cutter to shut off the circuit of the conductive connecting member. When external force caused due to, for example, vehicle collision is applied to the battery pack in the longitudinal direction of the battery pack, therefore, the conductive connecting member is easily cut by the shut-off cutter to release the electrical connection between the battery modules of the battery pack, thereby greatly improving safety of the battery pack.

Also, the shut-off cutter having the simple structure which operates mechanically is added to the existing conductive connecting member without the provision of an additional component, thereby securing safety of the battery pack during a collision as compared with a conventional middle or large-sized battery pack.

In addition, the electrode terminal connecting device does not use an electrical signal but submersion load of an external structure during a collision, thereby achieving very high operational reliability.

The shut-off circuit may be achieved by the shut-off cutter physically cutting the conductive connecting member, for example, when impact is applied to the battery pack in the longitudinal direction of the battery pack.

That is, external force applied to the battery pack in the longitudinal direction of the battery pack moves the shut-off cutter to the conductive connecting member, and the shut-off cutter cuts a portion of the conductive connecting member connecting the electrode terminals of the battery modules to release the electrical connection between the battery modules. Alternatively, the battery pack may move to the shut-off cutter to achieve desired cutting of the conductive connecting member.

The structure of the shut-off cutter is not particularly restricted so long as the shut-off cutter can easily cut the conductive connecting member in a physical manner. For example, the shut-off cutter may include a pointed end. In this case, the conductive connecting member is easily cut by the pointed end of the shut-off cutter.

As another example, the shut-off cutter may be made of an insulative material to easily cut the conductive connecting member without electrical spark. Alternatively, the shut-off cutter may include a main body made of an insulative material and a metal pointed end provided at an end of the main body.

In a case in which the shut-off cutter includes a main body made of an insulative material and a metal pointed end provided at an end of the main body as described above, the conductive connecting member may be easily cut by the metal pointed end. Electrical flow occurring at the contact surface of the conductive connecting member during cutting may be interrupted by the main body made of the insulative material.

The insulative material is not particularly restricted. For example, the insulative material may include ceramic or plastic. The metal material is not also particularly restricted. For example, the metal material may include iron, nickel, aluminum, copper or alloys thereof.

Meanwhile, as previously mentioned, it is necessary for the conductive connecting member to be reliably cut by the shut-off cutter, thereby securing safety of the battery pack when impact is applied to the battery pack in the longitudinal direction of the battery pack. In a preferred example, the conductive connecting member may be configured so that an upper end portion and a lower end portion of a region thereof corresponding to the shut-off cutter are depressed inward to a predetermined depth so as to achieve reliable cutting of the conductive connecting member.

Specifically, the upper end portion and the lower end portion of the conductive connecting member are depressed inward with the result that the size of the region to be cut is decreased. Consequently, the shut-off cutter moves to the conductive connecting member due to external impact to easily cut the depressed region of the conductive connecting member.

As a modification of the above structure, the conductive connecting member may be provided at a region thereof corresponding to the shut-off cutter with a notch or a slit, at which the shut-off cutter easily cuts the conductive connecting member.

The conductive connecting member is a member provided to achieve electrical connection between the electrode terminals. Preferably, the conductive connecting member is formed of a plate-shaped metal member having electrode terminals insertion holes formed at positions corresponding to the electrode terminals of the battery module so that the electrode terminals of the battery module are inserted through the respective electrode terminals insertion holes. The conductive connecting member has a length sufficient to electrically connect two or more electrode terminals to each other, the conductive connecting member is provided at positions thereof corresponding to the distance between the electrode terminals with electrode terminal insertion holes, and each of the electrode terminal insertion holes has an inner diameter greater, preferably, in the longitudinal direction of the battery pack so that the electrode terminals can be easily inserted through the electrode terminal insertion holes even when a positional deviation between the electrode terminals occurs.

In a preferred example, the protrusion of each of the electrode terminals is configured in a bolt structure formed a screw thread formed at the outer circumference thereof, and a predetermined fastening member may be configured in a nut structure having a screw thread corresponding to the outer circumference of a corresponding one of the electrode terminals so that the fastening member is coupled to the corresponding one of the electrode terminals. The electrode terminals each configured in the bolt structure are stably coupled to fastening members each configured in the nut structure in a state in which the electrode terminals are inserted through the electrode terminal insertion holes of the conductive connecting member.

Preferably, the electrode terminal connecting device further includes an insulative sheathing member mounted to the conductive connecting member in a state in which the insulative sheathing member surrounds the conductive connecting member, the insulative sheathing member being open at a rear thereof excluding regions thereof corresponding to opposite side steps of the conductive connecting member, the insulative sheathing member having a side wall protruding a predetermined height from an outer circumference of the conductive connecting member.

In the electrode terminal connecting device as described above, therefore, the coupling of the conductive connecting member to the electrode terminals of the battery module is achieved by the conductive connecting member having the specific structure and the insulative sheathing member, and, at the same time, the coupling between the conductive connecting member and the insulative sheathing member is achieved. Also, the electrical connection region between the electrode terminals is protected by the insulative sheathing member, thereby preventing the occurrence of a short circuit and thus greatly improving safety at the electrical connection region between the electrode terminals.

As a concrete example of the above structure, the conductive connecting member is configured so that opposite ends of the conductive connecting member protrude from the conductive connecting member in a state in which steps a having a predetermined height are formed at the opposite ends of the conductive connecting member, and the insulative sheathing member is provided at the inside thereof with a coupling member, having a height corresponding to the protruding thickness of the conductive connecting member and configured to have a downwardly tapered structure, to achieve secure coupling between the conductive connecting member and the insulative sheathing member. Consequently, the opposite ends of the conductive connecting member are stably coupled to the insulative sheathing member by the coupling member configured to have the downwardly tapered structure.

Specifically, when the conductive connecting member is inserted into the insulative sheathing member in a state in which the insulative sheathing member is located in the electrode terminals of the battery module, the coupling member configured to have the downwardly tapered structure allows the conductive connecting member to be inserted into the inside of the insulative sheathing member. After insertion, however, the coupling member configured to have the downwardly tapered structure prevents the conductive connecting member from being separated from the inside of the insulative sheathing member.

In the above structure, the insulative sheathing member may be provided at the inner top and/or bottom thereof with a guide rail to guide movement of the shut-off cutter when impact is applied to the battery pack. The guide rail stably guides the shut-off cutter to a desired region to be cut of the conductive connecting member, which is preferable.

In another preferred example, the insulative sheathing member may be open at the top thereof, and the middle or large-sized battery pack may further include an insulative cap mounted at the open top of the insulative sheathing member. Consequently, the electrical connection region of the insulative sheathing member is covered by the insulative cap with the result that electric current flowing in the conductive connecting member is completely isolated from the outside. Also, the insulative cap protects the connection region between the electrode terminals of the battery module and the conductive connecting member from external impact and, at the same time, prevents introduction of foreign matter and permeation of moisture.

The insulative cap may be configured in various structures. For example, the insulative cap may be mounted to the insulative sheathing member in a sliding manner. Also, the insulative cap may be disposed in tight contact with the upper end of the insulative sheathing member while elastically deforming the insulative sheathing member by a small width. In addition, the insulative cap may be coupled to one side of the insulative sheathing member in a hinged structure or in a fastened manner based on a predetermined coupling structure. Preferably, the insulative cap is made of the same insulative material as the insulative sheathing member. However, the insulative cap may be made of a different insulative material than the insulative sheathing member.

The structure of the shut-off cutter is not particularly restricted so long as the shut-off cutter is mounted in the insulative sheathing member to easily cut the conductive connecting member when external impact is applied to the battery pack. For example, the shut-off cutter may be mounted in the insulative sheathing member in a state in which the shut-off cutter is separated from the insulative cap. Alternatively, the shut-off cutter may be mounted in the insulative sheathing member in a state in which the shut-off cutter is coupled to the insulative cap.

Meanwhile, in a middle or large-sized battery pack configured to have a structure in which a plurality of battery modules are stacked and electrically connected to each other to provide high power and large capacity, electrode terminals of an outermost battery module are connected to an external device requiring power from the battery module via a linear connecting member, such as a power cable. Also, it may be necessary to locate a service plug on a path of a cathode or anode circuit so as to manually cut off electricity when it is necessary to confirm the operating state of the battery module as needed and to repair the battery module.

At this time, the insulative sheathing member mounted the electrode terminals of the outermost battery module or the battery module requiring to be electrically connected to the service plug, among the connecting members to electrically connect the respective battery modules to each other, further includes a guide part to guide wiring of the linear connecting member connected to the respective electrode terminals.

Consequently, the insulative sheathing member may be provided at the outer part of one side thereof with a guide part to easily achieve installation and wiring of another linear connecting member. In this case, the guide part may be configured to have a structure in which a hollow guide extends from a position corresponding to the electrode terminals of the battery modules. The guide part may extend upward or downward from a position corresponding to the electrode terminals of the battery modules based on the wiring position of the desired linear connecting member.

According to circumstances, a region of a battery module case corresponding to the electrode terminals may be configured to have a structure in which a region of the battery module case corresponding to the shut-off cutter is depressed inward so that the conductive connecting member is easily cut by the shut-off cutter when impact is applied to the battery pack in the longitudinal direction of the battery pack.

The battery pack may be configured to have a structure in which a plurality of battery modules, each having a cathode terminal and an anode terminal protruding from the same side thereof, is stacked. That is, in a case in which the cathode terminal and the anode terminal are formed at the same side of each of the battery modules, the size of a space caused due to the protrusion regions of the electrode terminals is reduced as compared with a case in which the cathode terminal and the anode terminal are formed at different sides of each of the battery modules. Consequently, it is possible to configure the battery pack in a more compact structure.

In this case, the electrode terminals of the battery modules may be arranged on the same line, the electrode terminal connecting device may be mounted at electrical connection region between the electrode terminals, and a plurality of insulative cap may be mounted to simultaneously cover open tops of a plurality of electrode terminal connecting devices.

As an example, the insulative cap may be configured in an integrated structure or in a separate structure having two insulative cap parts. Also, the insulative cap may be configured in an individual structure to cover the respective insulative sheathing members. Of course, one or more insulative caps may be provided based on desired regions to be covered of the electrode terminal connecting device.

In the middle or large-sized battery pack providing high power and large capacity, as previously described, a service plug is needed to manually cut off electricity when it is necessary to confirm the operating state of the battery module and to repair the battery module or when emergency requiring a shut-off circuit at an external device, such as a vehicle, occurs.

Consequently, the middle or large-sized battery pack according to the present invention may be configured to have a structure in which a service plug is mounted at one or more electrical connection regions between stacked battery modules to achieve a shut-off circuit.

In accordance with another aspect of the present invention, there is provided an electrode terminal connecting device to electrically connect a plurality of battery modules to each other. Specifically, the electrode terminal connecting device includes a conductive connecting member coupled to electrode terminals of the battery modules to electrically connect the electrode terminals of the battery modules to each other, the conductive connecting member being provided at opposite sides thereof with steps, a shut-off cutter mounted to the outside of the conductive connecting member to shut off the circuit of the conductive connecting member when impact is applied to the battery pack in the longitudinal direction of the battery pack, and an insulative sheathing member mounted to the conductive connecting member in a state in which the insulative sheathing member surrounds the conductive connecting member, the insulative sheathing member being open at the rear thereof excluding regions thereof corresponding to the opposite side steps of the conductive connecting member, the insulative sheathing member having a side wall protruding a predetermined height from the outer circumference of the conductive connecting member.

Since the electrode terminal connecting device includes the conductive connecting member, the shut-off cutter and the insulative sheathing member, as described above, the conductive connecting member is easily cut by the shut-off cutter when impact is applied to the battery pack in the longitudinal direction of the battery pack. Also, it is possible to connect the battery modules in series and/or in parallel to each other. Consequently, it is possible to freely design the battery pack so that the battery pack provides desired power and capacity.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
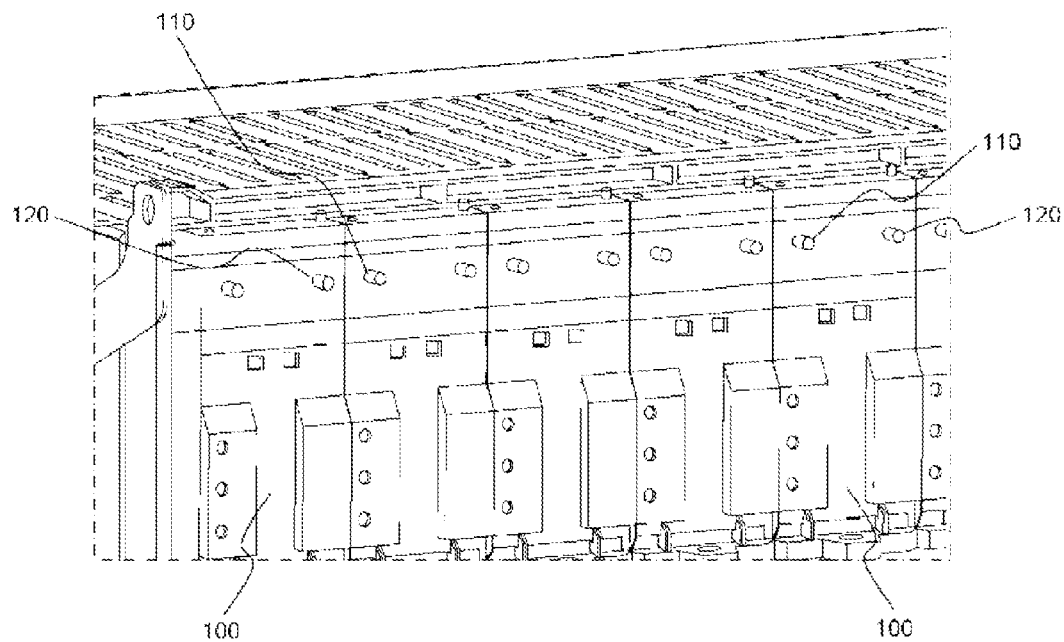
FIG. 1 is a partial typical view illustrating the side structure of a form including a plurality of stacked battery modules.

FIG. 1 is a partial typical view illustrating the side structure of a form including a plurality of stacked battery modules.

Referring to FIG. 1, a middle or large-sized battery pack, providing high-power, large-capacity electricity, includes a plurality of battery modules 100. Electrode terminals 110 and 120 protrude from one side of each of the battery modules 100. The electrode terminals 110 and 120 are arranged on the same line such that the electrode terminals 110 and 120 are parallel in the stacked direction of the battery modules 100. Also, a screw thread (not shown) is formed at the outer circumference of each of the protruding electrode terminals 110 and 120 so that the conductive connecting member to electrically connect the battery modules 100 to each other can be easily coupled to the electrode terminals 110 and 120.

Figure 2:
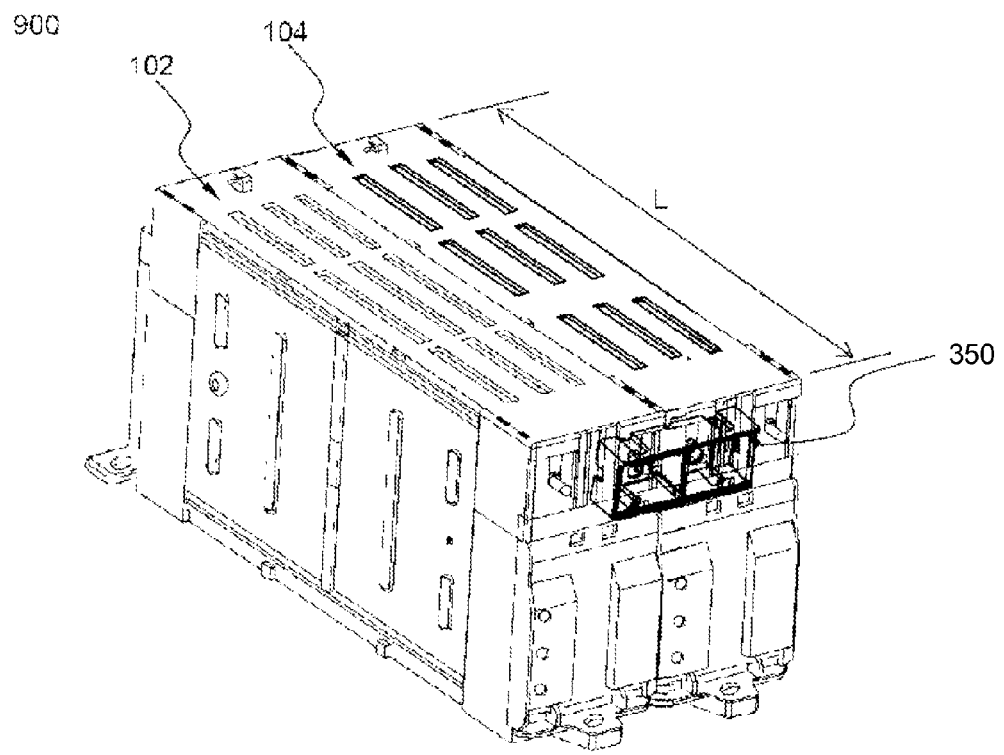
FIG. 2 is a perspective view illustrating a middle or large-sized battery pack according to an embodiment of the present invention.
Figure 3:
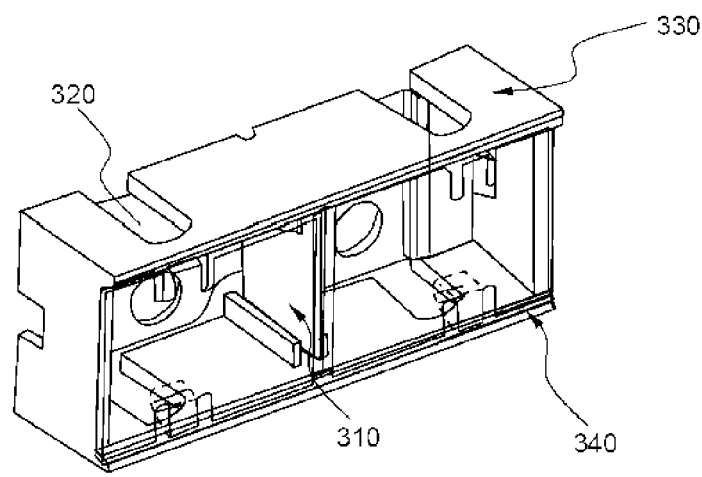
FIG. 3 is a typical view illustrating an electrode terminal connecting device of FIG. 2.

FIG. 2 is a perspective view typically illustrating a middle or large-sized battery pack according to an embodiment of the present invention, and FIG. 3 is a typical view illustrating an electrode terminal connecting device of FIG. 2.

Referring to these drawings, a middle or large-sized battery pack 900 includes two battery modules 102 and 104 electrically connected to each other via an electrode terminal connection device 350. A larger number of battery modules 102 and 104 may be electrically connected to each other so as to power and capacity of the battery pack.

The electrode terminal connection device 350 includes a conductive connecting member 320 coupled to electrode terminals of the battery modules 102 and 104 to electrically connect the electrode terminals of the battery modules 102 and 104 to each other, a shut-off cutter 310 mounted to the conductive connecting member 320 to shut off the conductive connecting member 320 when impact is applied to the battery pack in the longitudinal direction L of the battery pack, an insulative sheathing member 330 mounted to the conductive connecting member 320 in a state in which the insulative sheathing member 330 surrounds the conductive connecting member 320, the insulative sheathing member 330 being open at the rear thereof excluding regions thereof corresponding to opposite side steps of the conductive connecting member 320, the insulative sheathing member 330 having a side wall protruding a predetermined height from the outer circumference of the conductive connecting member 320, and an insulative cap 340 mounted at the open upper end of the insulative sheathing member 330.

Figure 4:
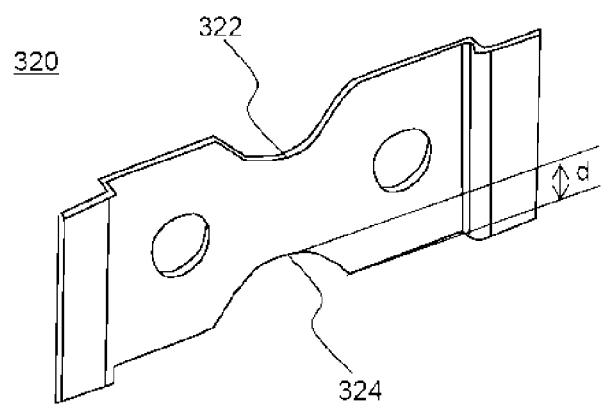
FIG. 4 is a typical view illustrating a conductive connecting member of FIG. 3.
Figure 5:
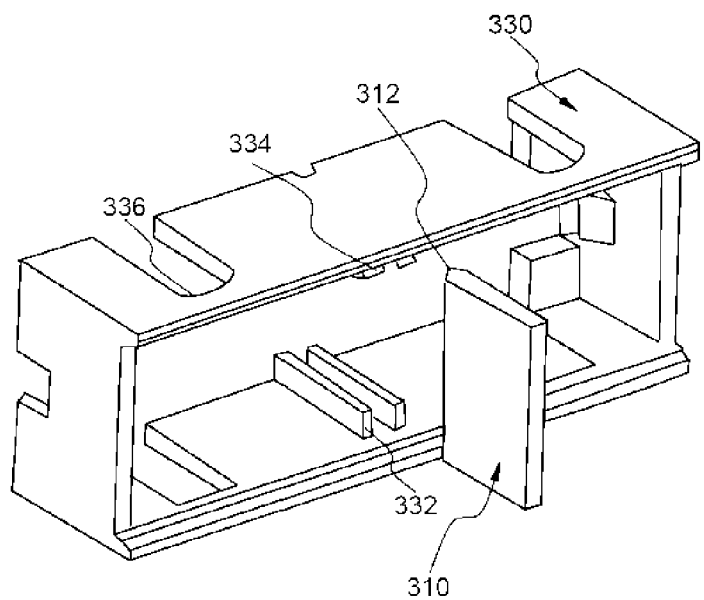
FIG. 5 is a typical view illustrating an insulative sheathing member and a shut-off cutter of FIG. 3.
Figure 6:
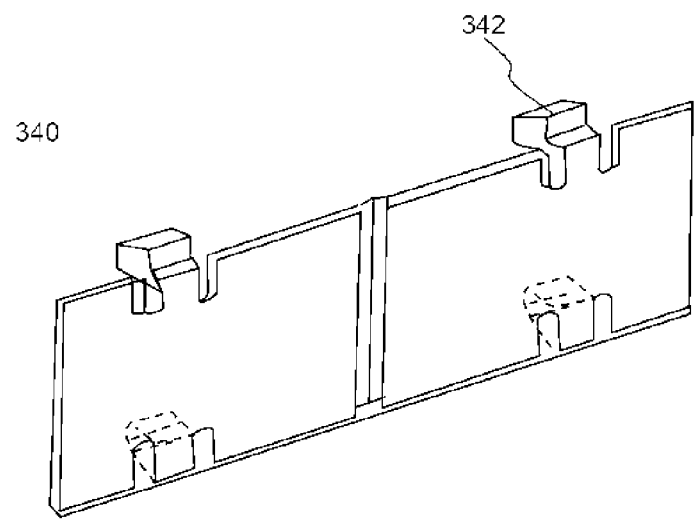
FIG. 6 is a typical view illustrating an insulative cap of FIG. 3.

FIG. 4 is a typical view illustrating the conductive connecting member of FIG. 3, FIG. 5 is a typical view illustrating the insulative sheathing member and the shut-off cutter of FIG. 3, and FIG. 6 is a typical view illustrating the insulative cap of FIG. 3.

Referring to these drawings together with FIG. 2, the conductive connecting member 320 is configured so that an upper end portion 322 and a lower end portion 324 of a region thereof corresponding to the shut-off cutter 310 having a pointed end 312 are depressed inward to a predetermined depth d. When impact is applied to the battery pack in the longitudinal direction L of the battery pack, therefore, the pointed end 312 of the shut-off cutter 310 physically cuts the conductive connecting member 320.

Also, guide rails 332 and 334 to stably guide the shut-off cutter 310 to the depressed region of the conductive connecting member 320 when impact is applied to the battery pack are formed at the inner top and bottom of the insulative sheathing member 330.

Hinged protrusions 342 are formed at predetermined portions of the upper end and the lower end of the insulative cap 340 so that the hinged protrusions 342 can be elastically coupled to depressions 336 of the insulative sheathing member 330. The hinged protrusions 342 may be separated from the depressions 336 of the insulative sheathing member 330 as needed.

Figure 7:
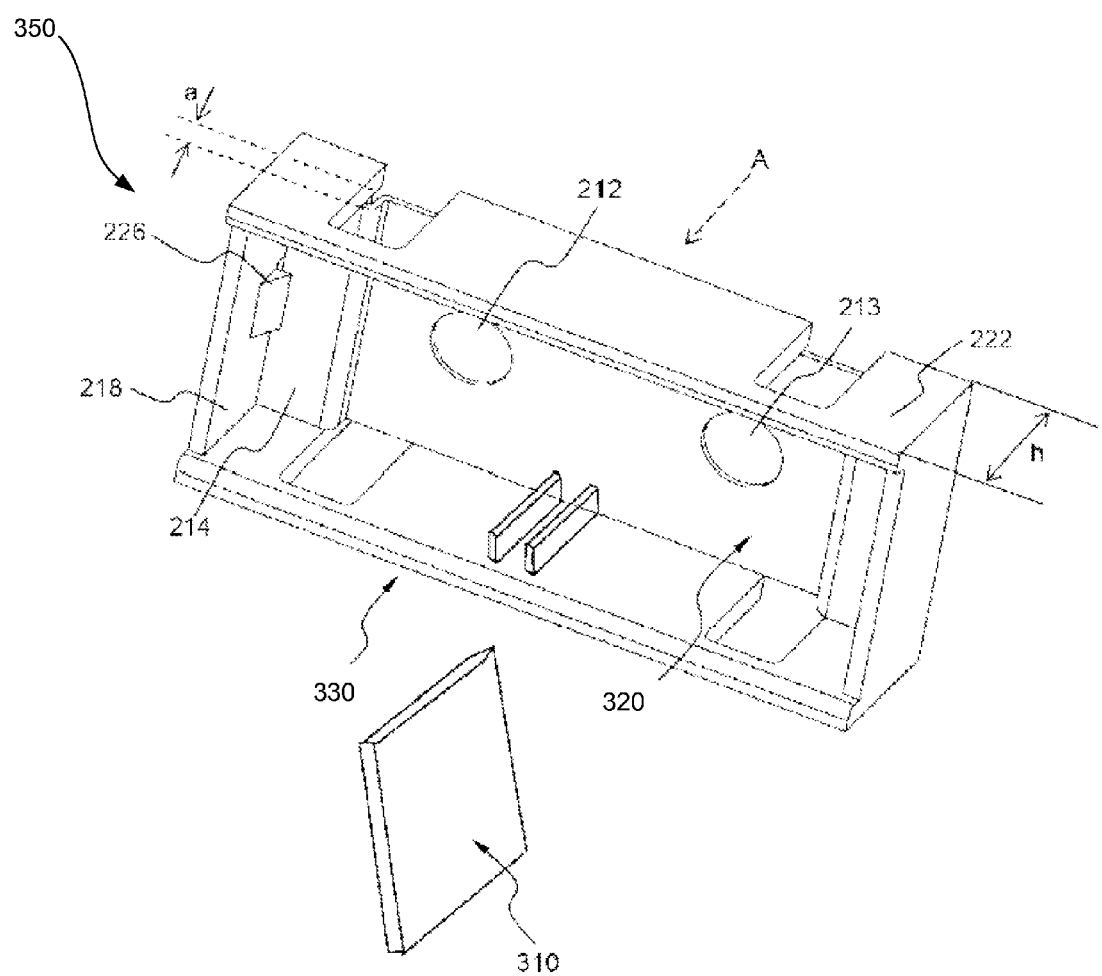
FIGS. 7 and 8 are typical views illustrating electrode terminal connecting devices according to other embodiments of the present invention.
Figure 8:
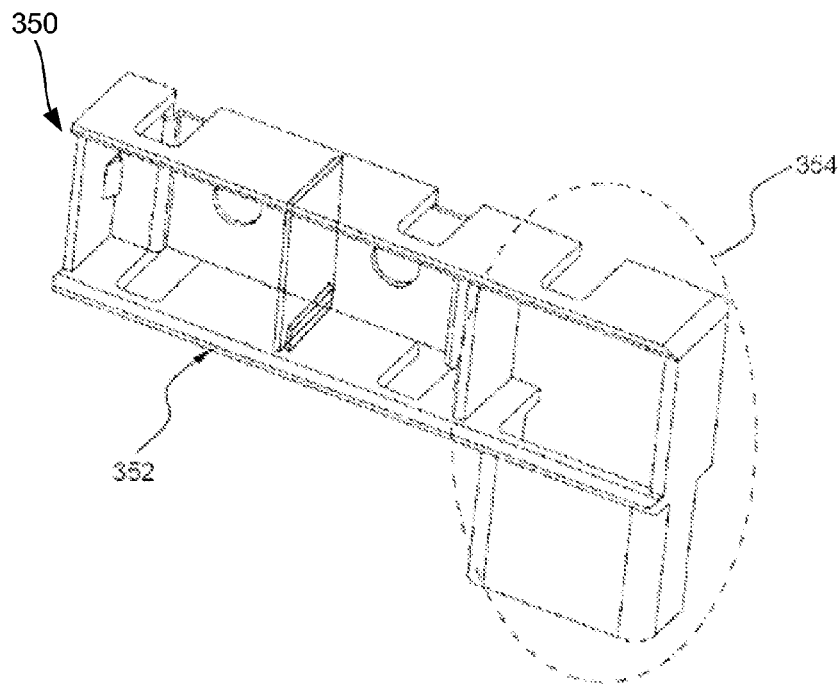

FIGS. 7 and 8 are typical views illustrating electrode terminal connecting devices according to other embodiments of the present invention.

Referring to FIG. 7 together with FIG. 1, an electrode terminal connection device 350 includes a conductive connecting member 320 to electrically connect electrode terminals to each other, an insulative sheathing member 330 mounted to the conductive connecting member 320 in a state in which insulative sheathing member 330 surrounds the conductive connecting member 320 to protect connection regions between the conductive connecting member 320 and the electrode terminals, and a shut-off cutter 310 to shut off the conductive connecting member 320.

The conductive connecting member 320 is provided with a pair of electrode terminal insertion holes 212 and 213 into which electrode terminals 110 and 120 of a battery module are mechanically coupled. Opposite ends of the conductive connecting member 320 protrude from the outer circumference of the conductive connecting member 320 in a state in which steps having a predetermined height "a" are formed at the opposite ends of the conductive connecting member 320.

The insulative sheathing member 330 surrounds the conductive connecting member 320. The insulative sheathing member 330 includes a side wall 222 having a predetermined height h with respect to the outer circumference of the conductive connecting member 320. The top of the insulative sheathing member 330 is open to achieve easy connection between the electrode terminals 110 and 120 and the conductive connecting member 320. Also, the rear of the insulative sheathing member 330 is open excluding regions thereof corresponding to opposite side terminal portions 214 of the conductive connecting member 320.

A pair of coupling members 226, having a height approximately equivalent to the thickness of the conductive connecting member 320 and configured to have a downwardly tapered structure, protrudes from the inside 218 of the insulative sheathing member 330. Consequently, the conductive connecting member 320, which is formed in the shape of a plate, is inserted into the insulative sheathing member 330 through the open upper end of the insulative sheathing member 330, and the opposite ends of the conductive connecting member 320 are coupled to the coupling members 226. After the coupling between the opposite ends of the conductive connecting member 320 and the coupling members 226, the conductive connecting member 320 is prevented from being separated upward by virtue of the tapered structure of each of the coupling members 226.

Referring to FIG. 8, an electrode terminal connection device 350 further includes a hollow guide 354 extending downward from an outer part of one side of a sheathing member 352. The hollow guide 354 may be used to guide a power cable connected to electrode terminals of an outermost battery module of a middle or large-sized battery pack and a cable (not shown) connected to a service plug.

In a case in which the hollow guide 354 is located in the downward direction as shown in the drawing, the cables may be positioned below the positions of the electrode terminals. On the other hand, the hollow guide 354 may be rotated 180 degrees in the horizontal direction so that the cables can be positioned above the positions of the electrode terminals. Also, the hollow guide 354 may be formed at the left side of the sheathing member 352 as needed although the hollow guide 354 is shown as being formed at the right side of the sheathing member 352 in the drawing.

Figure 9:
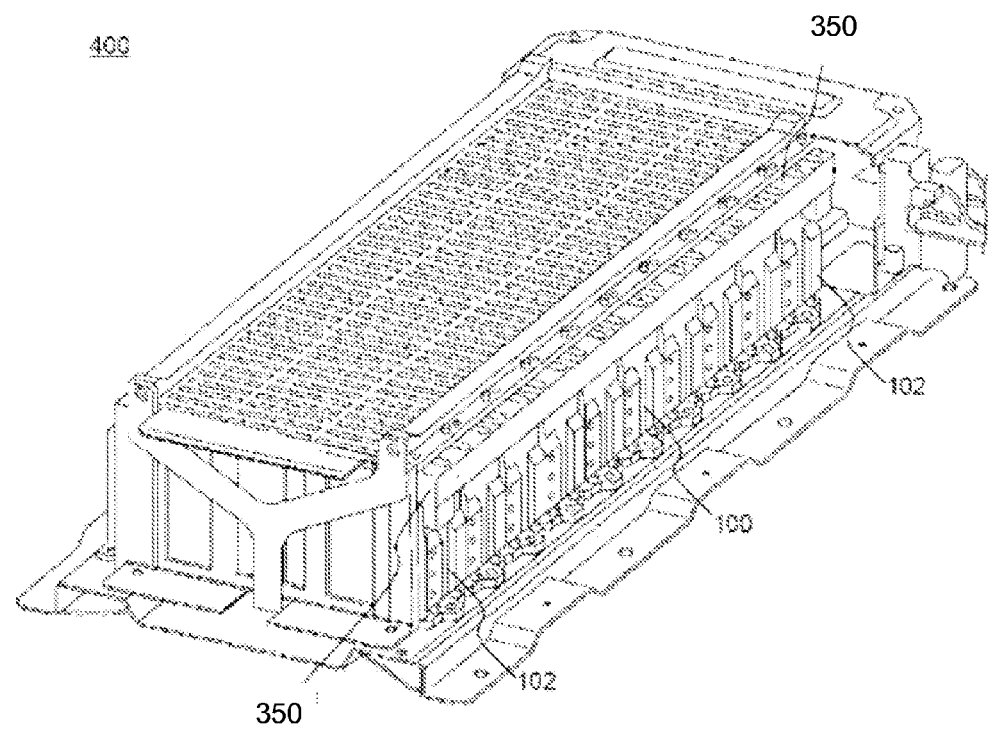
FIGS. 9 and 10 are perspective views illustrating middle or large-sized battery packs according to various embodiments of the present invention.
Figure 10:
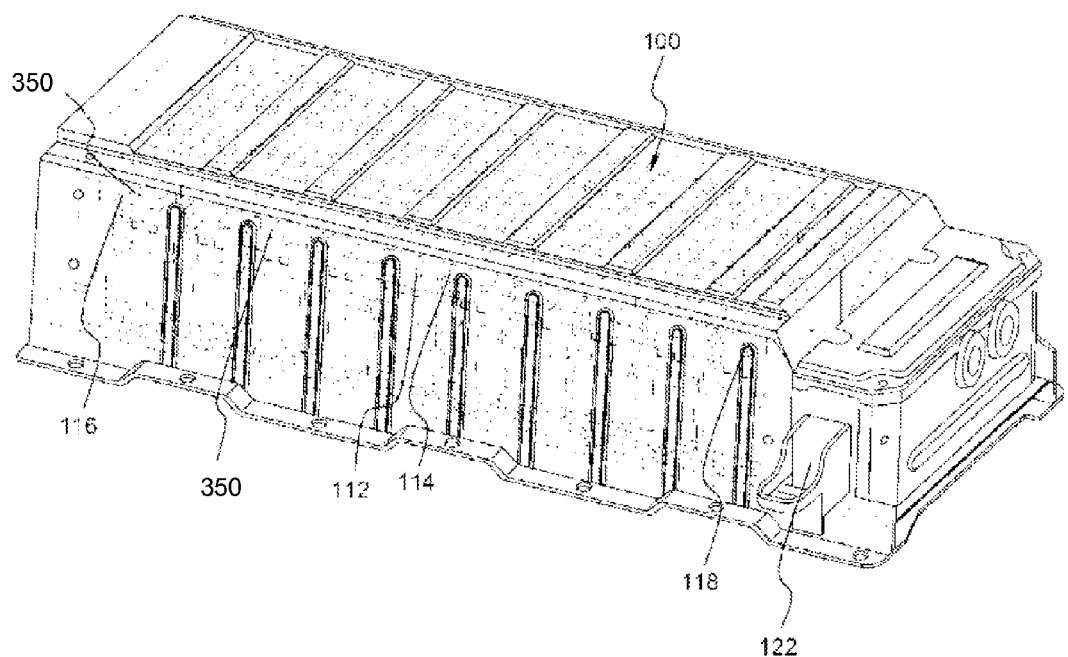

FIGS. 9 and 10 are perspective views typically illustrating middle or large-sized battery packs according to various embodiments of the present invention.

Referring to these drawings, a middle or large-sized battery pack 400 is configured to have a structure in which a plurality of battery modules 100 each having a cathode terminal and an anode terminal protruding from the same side thereof are stacked. All of the electrode terminals of the battery modules 100 are located at one side of the middle or large-sized battery pack 400. An electrode terminal connecting device 350 electrically connects a cathode terminal of a battery module 100 and an anode terminal of an adjacent battery module.

Referring to FIG. 10, an electrode terminal connection device 350 further including a hollow guide to guide a power cable and a cable electrically connected to a service plug 122 is mounted to electrode terminals 116 and 118 of an outermost battery module 102 and electrode terminals 112 and 114 of a middle battery module.

That is, the cable connected to the service plug 122 extends from the electrode terminals 112 and 114 of the battery module located at the middle of the middle or large-sized battery pack so that the cable can be connected to the service plug 122 via the hollow guide of the electrode terminal connecting device.

Also, an insulative cap (not shown) is mounted at the open top of the middle or large-sized battery pack 400 to protect connection regions between the electrode terminals 112, 114, 116 and 118 and the electrode terminal connecting devices 350, thereby preventing the occurrence of a short circuit.

Figure 11:
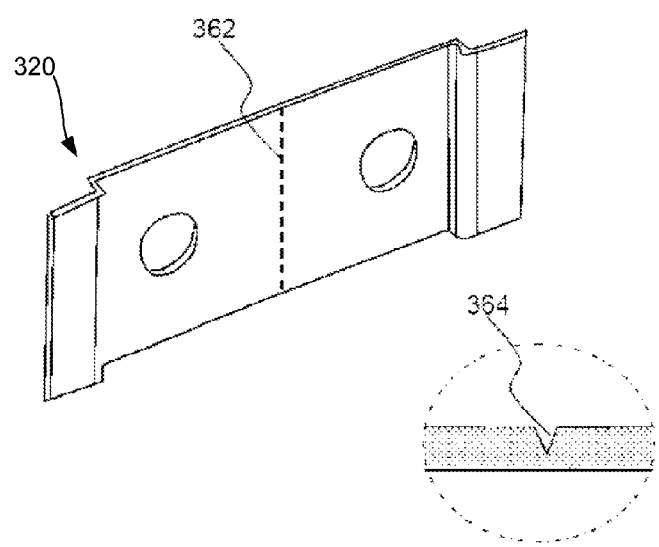
FIG. 11 is a typical view illustrating a conductive connecting member according to another embodiment of the present invention.

FIG. 11 is a typical view illustrating a conductive connecting member according to another embodiment of the present invention.

Referring to FIG. 11, a conductive connecting member 320 is provided at a region thereof corresponding to a shut-off cutter (not shown) with a slit 362 or a notch 364, at which the shut-off cutter more easily cuts the conductive connecting member when impact is applied to a battery pack in the longitudinal direction of the battery pack.

INDUSTRIAL APPLICABILITY

As is apparent from the above description, the middle or large-sized battery pack according to the present invention includes an electrode terminal connecting device including a conductive connecting member having a specific structure and a shut-off cutter. When external force caused due to, for example, vehicle collision is applied to the battery pack in the longitudinal direction of the battery pack, therefore, the conductive connecting member is cut by the shut-off cutter to release the electrical connection between battery modules, thereby lowering risks at the level of the battery pack to the level of the battery modules.

Also, it is possible to stably and easily achieve electrical connection between the electrode terminals at the electrode terminal connection region in a simple structure through the use of the electrode terminal connecting device. Consequently, it is possible to lower manufacturing cost and to easily achieve installation and wiring of a linear member for electrical connection with an external device or an internal device.

Furthermore, the electrode terminals connection is isolated from the outside, thereby preventing the occurrence of a short circuit and corrosion due to moisture and thus greatly improving safety of the battery modules.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack having a plurality of electrically connected battery modules, the battery pack comprising an electrode terminal connecting device, wherein the electrode terminal connecting device comprises:

a conductive connecting member coupled to electrode terminals of the battery modules to electrically connect the electrode terminals of the battery modules to each other, the conductive connecting member including opposite ends that protrude to form steps having a predetermined height, and a channel disposed between the opposite ends;

an insulative sheathing member coupleable to the conductive connecting member and surrounding the conductive connecting member, the insulative sheathing member including at least one coupling member on an inside thereof having a tapered structure for securing to an opposite end of the conductive connecting member, and being open at a rear thereof to expose a region of the conductive connecting member between the opposite ends; and a shut-off cutter mounted to the conductive connecting member to shut off a circuit of the conductive connecting member when impact is applied to the battery pack in a longitudinal direction of the battery pack, the shut-off cutter being disposed adjacent the channel;

wherein the shut-off cutter physically cuts the conductive connecting member when impact is applied to the battery pack in the longitudinal direction of the battery pack; and wherein the conductive connecting member is configured so that an upper end portion and a lower end portion of a region thereof corresponding to the shut-off cutter are depressed inward to a predetermined depth.

2. The battery pack according to claim 1, wherein the shut-off cutter comprises a pointed end.

3. The battery pack according to claim 1, wherein the shut-off cutter is made of an insulative material or comprises a main body made of an insulative material and a metal pointed end provided at an end of the main body.

4. The battery pack according to claim 1, wherein the conductive connecting member is provided at a region thereof corresponding to the shut-off cutter with a notch or a slit, at which the shut-off cutter cuts the conductive connecting member.

5. The battery pack according to claim 1, wherein the conductive connecting member has a length sufficient to electrically connect two or more electrode terminals to each other, the conductive connecting member is provided at positions thereof corresponding to a distance between the electrode terminals with electrode terminal insertion holes, and each of the electrode terminal insertion holes has an inner diameter greater in the longitudinal direction of the battery pack so that the electrode terminals can be inserted through the electrode terminal insertion holes even when a positional deviation between the electrode terminals occurs.

6. The battery pack according to claim 1, wherein the insulative sheathing member is provided at an inner top and/or bottom thereof with a guide rail to guide movement of the shut-off cutter when impact is applied to the battery pack.

7. The battery pack according to claim 1, wherein the insulative sheathing member is open at a top thereof, and the battery pack further comprises an insulative cap mounted at the open top of the insulative sheathing member.

8. The battery pack according to claim 7, wherein the insulative cap is coupled to the insulative sheathing member in a hinged structure or in a fastened manner.

9. The battery pack according to claim 7, wherein the shut-off cutter is mounted in the insulative sheathing member in a state in which the shut-off cutter is separated from the insulative cap or in a state in which the shut-off cutter is coupled to the insulative cap.

10. The battery pack according to claim 1, wherein the insulative sheathing member is provided at an outer part of one side thereof with a guide part to achieve installation and wiring of another linear connecting member.

11. The battery pack according to claim 10, wherein the guide part is configured to have a structure in which a hollow guide extends upward or downward from a position corresponding to the electrode terminals of the battery modules.

12. The battery pack according to claim 1, wherein a region of a battery module case corresponding to the electrode terminals is configured to have a structure in which a region of the battery module case corresponding to the shut-off cutter is depressed inward so that the conductive connecting member is cut by the shut-off cutter when impact is applied to the battery pack in the longitudinal direction of the battery pack.

13. The battery pack according to claim 1, wherein the battery pack is configured to have a structure in which a plurality of battery modules, each having a cathode terminal and an anode terminal protruding from the same side thereof, is stacked.

14. The battery pack according to claim 1, wherein the electrode terminals of the battery modules are aligned, the electrode terminal connecting device is mounted at electrical connection region between the electrode terminals, and a plurality of insulative caps is mounted to simultaneously cover open tops of a plurality of electrode terminal connecting devices.

* * * * *